United States Patent
Tsuchizawa et al.

(10) Patent No.: US 7,344,119 B2
(45) Date of Patent: Mar. 18, 2008

(54) SOLENOID VALVE

(75) Inventors: Toshiaki Tsuchizawa, Tokyo (JP); Kouichi Teraki, Tokyo (JP)

(73) Assignee: Koganei Corporation, Tokyo (JP)

( * ) Notice: Subject to any disclaimer, the term of this patent is extended or adjusted under 35 U.S.C. 154(b) by 0 days.

(21) Appl. No.: 11/628,380

(22) PCT Filed: Apr. 28, 2005

(86) PCT No.: PCT/JP2005/008231

§ 371 (c)(1),
(2), (4) Date: Dec. 1, 2006

(87) PCT Pub. No.: WO2005/119107

PCT Pub. Date: Dec. 15, 2005

(65) Prior Publication Data

US 2007/0181839 A1     Aug. 9, 2007

(30) Foreign Application Priority Data

Jun. 3, 2004   (JP) .............................. 2004-166315

(51) Int. Cl.
*F16K 31/02*   (2006.01)
(52) U.S. Cl. ................... 251/129.15; 251/333
(58) Field of Classification Search ........... 251/129.15, 251/333
See application file for complete search history.

(56) References Cited

U.S. PATENT DOCUMENTS 2,886,063 A * 5/1959 Ray ....................... 137/625.27
4,056,255 A * 11/1977 Lace ....................... 251/129.15
5,441,233 A * 8/1995 Asou et al. ............. 251/129.15
5,565,832 A * 10/1996 Haller et al. ................. 335/249
6,666,429 B2 * 12/2003 Fukano et al. ......... 251/129.04

FOREIGN PATENT DOCUMENTS

| JP | 09-060758 | 3/1997 |
|----|-----------|--------|
| JP | 2551917   | 6/1997 |
| JP | 09-292051 | 11/1997 |
| JP | 11-125357 | 5/1999 |
| JP | 2000-205432 | 7/2000 |
| JP | 2001-280519 | 10/2001 |

* cited by examiner

*Primary Examiner*—John K. Fristoe, Jr.
(74) *Attorney, Agent, or Firm*—McCormick, Paulding & Huber LLP

(57) ABSTRACT

A solenoid valve includes a poppet formed by a valve body and a supporting plate, the supporting plate having a front surface which the valve body is firmly fixed and a rear surface contacting a tip surface of a plunger. The solenoid valve further includes a cap having: a cylindrical portion which is fitted to an outer circumference of the plunger; an inward projecting portion which projects inwardly from the cylindrical portion so as to abut an outer circumferential portion of the front surface of the supporting plate; and an outward projecting portion which projects outwardly from the cylindrical portion so as to be engaged with a spring member. The poppet is press-inserted into the cap such that the inward projecting portion of the cap and the outer circumferential portion of the front surface of the supporting plate abut each other, and the cap is press-inserted into a tip portion of the plunger such that the poppet is attached on the tip surface of the plunger.

2 Claims, 2 Drawing Sheets

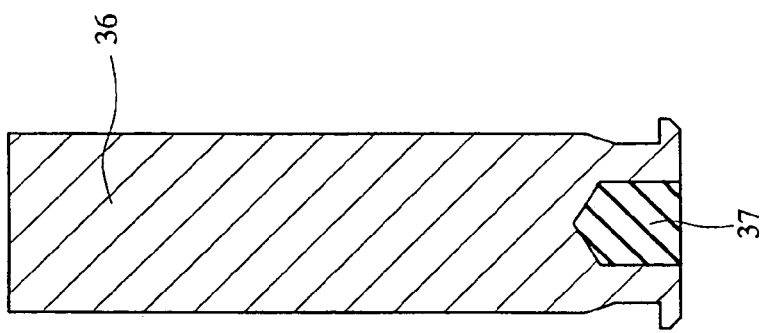
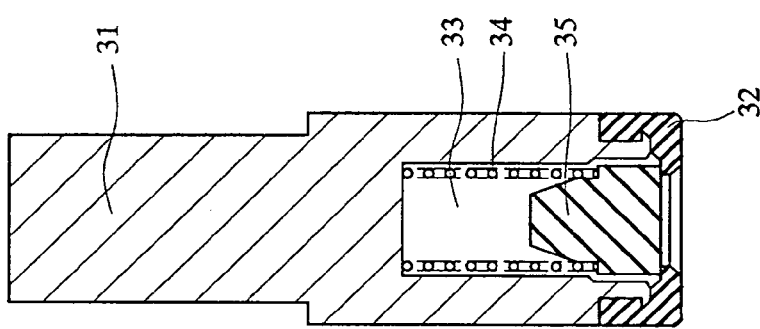
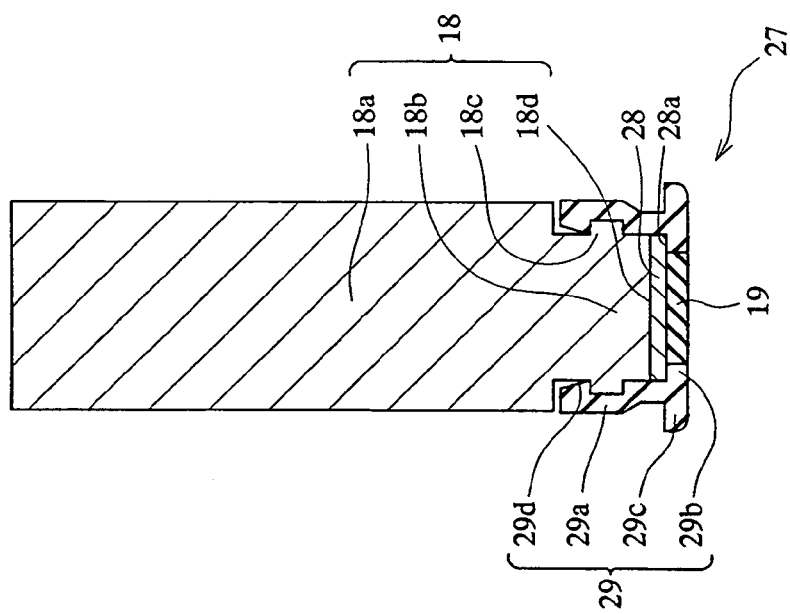

SOLENOID VALVE

TECHNICAL FIELD

The present invention relates to a solenoid valve for opening/closing a flow path by controlling a current carried to a solenoid.

BACKGROUND ART

A directional control valve such as a control valve or a check valve is used for making air flow in an air pressure pipe, stopping its flow, and changing directions of its flow. Of the directional control valves, the valve which opens/closes the flow path by controlling the current carried to the solenoid is called a solenoid valve.

The solenoid comprises a coil, a column, and a plunger, wherein when the current is carried to the coil, the plunger is attracted by the magnetized column and, in cooperation with such attraction, a main valve thereof can be shifted. A type of main valve includes a poppet type in which a valve body moves a vertical direction of its valve seat so as to open/close the flow path, a spool type in which the valve body inscribed on a cylinder moves axially so as to open/close the flow path, and a slide type in which the valve body having the valve seat moves on a sliding surface so as to open/close the flow path.

The poppet type of solenoid valve has a plunger provided with the valve body, and a spring member by which a spring force in a direction of closing the valve seat is applied to the valve body, so that when the current is carried to the coil, the valve body attracted by the column causes the valve seat to open against the spring force and when no current is carried, the valve body causes the valve seat to close by the spring force. When the valve body of poppet type is formed of an elastic body such as synthetic rubber, if biased to the valve seat, the valve body is elastically deformed, so that a hermetically-closed property of the valve seat can be enhanced.

In previous plungers, there is a plunger in which a concave portion is processed in one end portion of the plunger opposite to the valve seat and an inner circumferential surface of the concave portion is coated with an adhesive agent and an elastic body such synthetic rubber is baked as a valve body to the concave portion (see Patent Document 1). Further, in the previous plungers, there is a plunger in which an accommodating chamber is processed in a tip portion of the plunger and the valve body and a spring member for applying a pressing force to the valve body are incorporated in this accommodating chamber (see Patent Document 2).

Patent Document 1: Japanese Patent Laid-Open Publication No. 2001-280519

Patent Document 2: Japanese Patent Laid-Open Publication No. 11-125357

DISCLOSURE OF THE INVENTION

Conventionally, in the rubber-made valve body provided at a tip of the plunger, its thickness dimension in an opening/closing direction of the valve body is increased so that the valve body is sufficiently elastically deformed and securely contacts with the valve seat, and the spring member is incorporated in the accommodating chamber so as to apply the spring force to the valve body in a manner as described above. However, when a diameter of the valve seat is increased to increase a flow rate of fluid or the solenoid valve is used in a pneumatic pressure pipe with high fluid pressure, large fluid pressure is applied to the plunger. For this reason, since the valve seat must be closed against such large fluid pressure, a spring member having a strong spring force is used in the solenoid valve. If such a spring member is used, permanent distortion caused by compression deformation occurs easily in the valve body formed of an elastic body such as synthetic rubber. The valve body is deformed plastically with an increase in the accumulated permanent distortion, so that its dimensional accuracy deteriorates with time.

The valve body formed by baking the elastic body such as synthetic rubber into the concave portion of the plunger with high stiffness is more difficult to deform than the case where the valve body composed of only the elastic body is incorporated into the accommodating chamber along with the spring member. However, in a conventional manufacturing method of baking the elastic body into the concave portion, productivity is low and manufacture cost is high in that respective steps of processing and cleaning the plunger and coating it with the adhesive agent are required before baking and that steps of cutting surplus portions and grinding the cut portions are required after the baking.

An object of the present invention is to provide a solenoid valve which can achieve improvement of the productivity and a reduction in the manufacture cost.

Another object of the present invention is to provide a solenoid valve which can achieve improvement of durability and stabilization of quality by using a valve body with small permanent distortion.

A solenoid valve according to the present invention has: a housing in which a port in which fluid flows and a port from which the fluid flows out are formed and a valve seat provided in a flow path which mutually communicates with the ports is formed; a metallic plunger incorporated in the housing so as to oppose the valve seat and attracted by a magnetized column; a valve body provided in the plunger and opening/closing the valve seat; and a spring member for applying a spring force to the valve body in a direction of closing the valve seat, the solenoid valve comprising: a poppet formed by the valve body and a supporting plate, the supporting plate having a front surface to which the valve body is firmly fixed and a rear surface contacting a tip surface of the plunger; and a cap having a cylindrical portion fitted to an outer circumference of the plunger, an inward projecting portion projecting inwardly from the cylindrical portion so as to abut an outer circumferential portion of the front surface of the supporting plate, and an outward projecting portion projecting outwardly from the cylindrical portion so as to be engaged with the spring member.

The solenoid valve according to the present invention is such that pawl portions formed on an outer circumference of the plunger and an inner circumference of the cylindrical portion engage each other to hold the cap to the plunger in a fitted state.

According to the present invention, since the poppet, the cap, and the plunger can be respectively assembled by press-insertion, the improvement of productivity and the reduction in manufacture cost can be achieved. Since these members have been assembled by press-insertion, only any worn member can be replaced and the other members can be recycled.

According to the present invention, since the valve body is baked to the supporting plate which is hard to deform, the compression permanent distortion is hard to cause, i.e., the dimensional accuracy is hard to deteriorate. Consequently, the improvement of durability and the stabilization of quality can be achieved.

BRIEF DESCRIPTION OF THE DRAWINGS

FIG. 3 is an enlarged sectional view showing a state of attaching the poppet shown in FIG. 2 to a plunger; and FIGS. 4A and 4B are sectional views showing a conventional plunger having a poppet type of valve body.

BEST MODE FOR CARRYING OUT THE INVENTION

Figure 1:
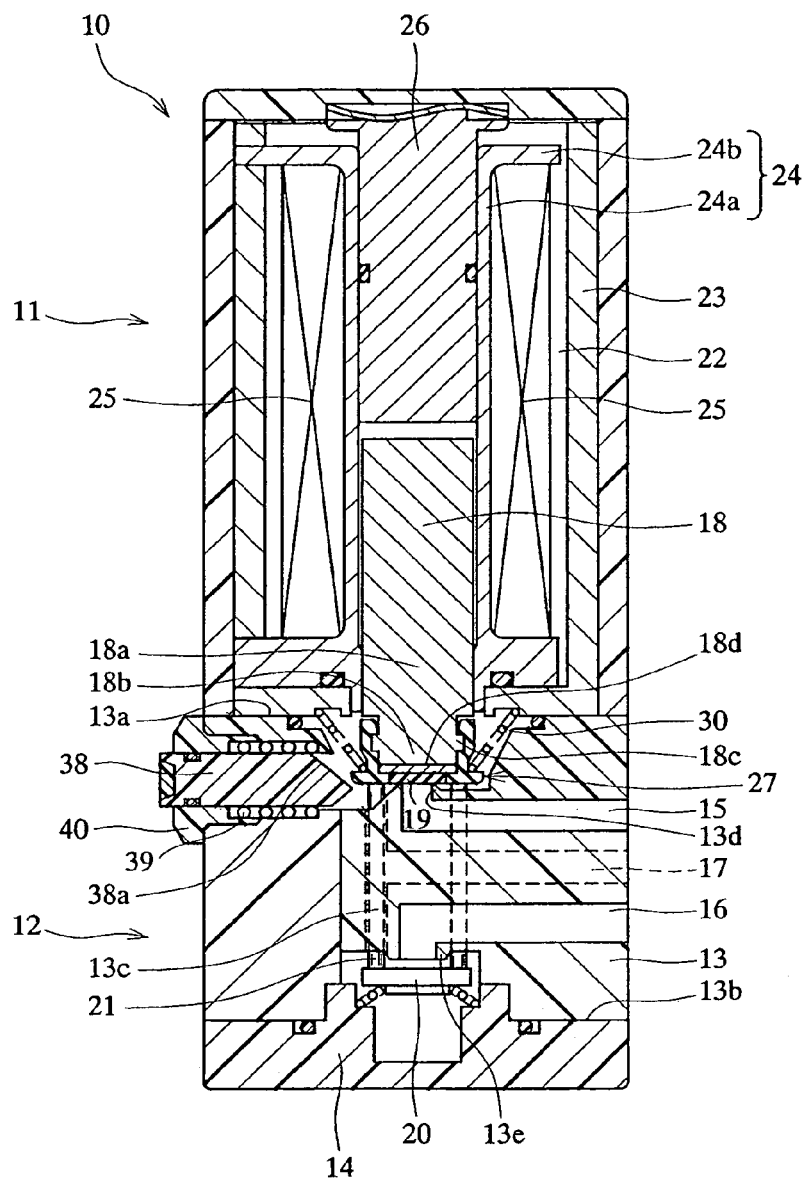
FIG. 1 is a sectional view of a solenoid valve according to an embodiment of the present invention.

Hereinafter, embodiments of the present invention will be detailed with reference to the drawings. As shown in FIG. 1, this solenoid valve 10 comprises a solenoid housing 11 and a valve housing 12. The valve housing 12 is constituted by a substantially rectangular parallelepiped main body block 13 and an end cover 14. An upper side of the main body block 13 serves as a connecting surface 13a in which the solenoid housing 11 is incorporated, and a lower side of the main body block 13 serves as a connecting surface 13b to which the end cover 14 is assembled. Three ports 15 to 17 are opened in a side surface continuous substantially perpendicularly to the connecting surfaces 13a and 13b.

The port provided in a solenoid side of the main body block 13 is a P port in which fluid flows, that is, a supply port 15; the port provided in a side of the end cover 14 is an R port, that is, an exhaust port 16; and the port provided between the supply port 15 and the exhaust port 16 is an A port from which fluid flows out, that is, an output port 17. These ports 15 to 17 become parallel to each other and extend toward an inside of the main body block 13. The supply port 15 is opened to the connecting surface 13a after its direction is changed to the solenoid side, the exhaust port 16 is opened to the connecting surface 13b after its direction is changed to a side of the end cover 14, and the output port 17 communicates with a plurality of through holes 13c opened to both of the connecting surfaces 13a and 13b.

A valve seat 13d is formed in the connecting surface 13a to which the supply port 15 is opened, and a metallic plunger 18 is incorporated in the solenoid housing 11 so as to oppose the valve seat 13d. The plunger 18 is provided with a valve body 19 for opening/closing the valve seat 13d, so that when the valve body 19 causes the valve seat 13d to open, the supply port 15 and the output port 17 communicate with each other so that fluid flowing into the supply port 15 flows out to the output port 17.

A valve seat 13e is formed in the connecting surface 13b to which the exhaust port 16 is opened, and a flapper 20 for opening/closing the valve seat 13e is incorporated in the valve housing 12 so as to oppose the valve seat 13e. A plunger pin 21 is reciprocably inserted into each through hole 13c so as to have a gap between the plunger pin 21 and an inner circumferential surface of the through hole 13c. An end of each plunger pin 21 contacts with the flapper 20, and the flapper 20 moves in cooperation with the valve body 19 by the plunger 18 through the plunger pin 21. Consequently, for example, if the valve body 19 moves downward as shown in FIG. 1 to close the valve seat 13d, the flapper 20 moves downward in cooperation with the plunger 18 to open the valve seat 13e. When the valve seat 13e is opened, the output port 17 and the exhaust port 16 communicate with each other so that fluid in the output port 17 can be discharged from the exhaust port 16.

A substantially rectangular parallelepiped accommodating chamber 22 is formed in the solenoid housing 11, and a magnetic frame 23 made of a ferromagnetic material is incorporated inside the accommodating chamber 22. A bobbin 24, which comprises a cylindrical portion 24a and flange portions 24b formed at both ends thereof, is fixed inside the magnetic frame 23 through the flange 24b. A coil 25 is wound around an outer circumference of the cylindrical portion 24a, and a column 26 to be magnetized by carrying a current to the coil 25 is fixed to an inner circumference of the cylindrical portion 24a. The plunger 18 to be attracted by the magnetized column 26 is axially slidably incorporated inside the cylindrical portion 24a and between the column 26 and the valve seat 13d.

The plunger 18 has a main body portion 18a with a slightly smaller diameter than that of the column 26 and a tip portion 18b with a smaller diameter than that of the main body portion 18a. The main body portion 18a opposes the column 26, and the tip portion 18b opposes the valve seat 13d, and a pawl portion 18c is provided projectingly on an outer circumference of the tip portion 18b.

Figure 2:
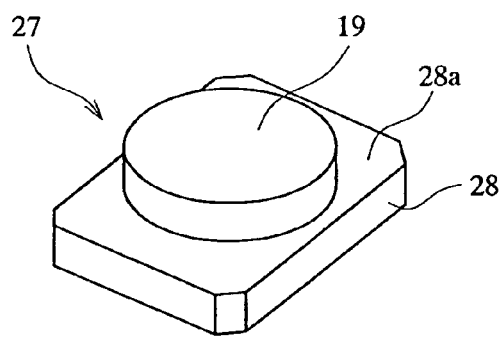
FIG. 2 is a perspective view of a poppet.

As shown in FIGS. 2 and 3, a flat tip surface 18d is formed on a tip portion 18b of the plunger 18, and a poppet 27 is provided on the tip surface 18d. The poppet 27 is formed by the valve body 19 and a supporting plate 28, the supporting plate 28 having a front surface to which the valve body 19 is firmly fixed and a rear surface which the tip surface 18d of the plunger 18 contacts. The supporting plate 28 is formed of a member having high stiffness which is hard to deform, such as a metal plate. The valve body 19 as shown in the drawing is formed into a disc shape by synthetic rubber, and the poppet 27 is formed by baking this valve body 19 onto a surface of the supporting plate 28.

As shown in FIG. 3, the poppet 27 is attached on the tip surface 18d of the plunger 18 by using a cap 29 made of a resin. The cap 29 comprises: a cylindrical portion 29a fitted to the outer circumference of the tip portion 18b of the plunger 18; an inward projecting portion 29b which projects inwardly from this cylindrical portion 29a and abuts an outer circumferential portion 28a of the front surface of the supporting plate 28; and an outward projecting portion 29c which projects outwardly from the cylindrical portion 29a. A pawl portion 29d, which is engaged with the pawl portion 18c provided at the tip portion 18b of the plunger 18, is formed on the inner circumference of the cylindrical portion 29a.

The poppet 27 is press-inserted into the cap 29 so that the inward projecting portion 29b of the cap 29 and the outer circumferential portion 28a of the front surface of the supporting plate 28 are abutting. Then, the cap 29 is press-inserted into the tip portion 18b of the plunger 18, such that the poppet 27 can be attached to the tip surface 18d of the plunger 18. Because the pawl portions 18c and 29d are engaged with each other when the plunger 18 is press-inserted, the cap 29 is held in a state of being fitted to the tip portion 18b of the plunger 18, so that the valve body 19 is exposed from an inside of the inward projecting portion 29b of the cap 29.

As shown in FIG. 1, when the plunger 18 equipped with the cap 29 is incorporated in the solenoid housing 11, a spring member 30 for applying, to the valve body 19, a spring force in a direction of closing the valve seat 13d is engaged with the outward projecting portion 29c of the cap 29. Consequently, when the current is carried to the coil 25, the valve body 19 attracted by the magnetized column 26 causes the valve seat 13d to open against the spring force of the spring member 30. On the other hand, when no current is carried, the valve body 19 causes the valve seat 13d to close by the spring force of the spring member 30. At this time, the valve body 19 formed of an elastic body such as synthetic rubber contacts closely with the valve seat 13d, so that the hermetically-closed property of the valve seat 13d can be enhanced.

As shown in FIG. 1, since the plunger pin 21 abuts on the outward projecting portion 29c, even if the plunger pin 21 does not contact directly with the tip surface of the metallic plunger 18, an occurrence of abrasion powder due to direct contact between metal members is prevented. By contacting the outer circumferential surface of the valve body 19 with the inner circumferential surface of the inward projecting portion 29b, deformation of the valve body 19 in a radial direction when a valve closing force or fluid pressure is exerted on the valve body 19 can be suppressed.

Because the valve closing force of the valve body 19 which opens/closes the valve seat 13d depends on the spring force of the spring member 30, when a heavy load is applied to the valve body 19, for example, when the solenoid valve 10 is employed in a pneumatic pressure pipe with high fluid pressure, it is necessary to incorporate a spring member 30 having a strong spring force for closing the valve seat 13d against the fluid pressure in the supply port 15. Generally, if the valve closing force of the valve body 19 to the valve seat 13d rises, permanent distortion accompanied by compression deformation easily occurs in the valve body 19 formed of an elastic body such as synthetic rubber. However, in the solenoid valve as shown in FIG. 1, the valve body 19 is baked to the supporting plate 28 which is hard to deform, so that even when the valve body 19 is pressed to the valve seat 13d, the deformation of the valve body 19 is suppressed and the compression permanent distortion is hard to cause. That is, the solenoid valve as shown in FIG. 1 has a structure whose dimensional accuracy does not deteriorate easily.

As shown in FIG. 4A, an accommodating chamber 33 is formed in the tip portion of the plunger 31. When the valve body 35 and the spring member 34 are incorporated in the chamber and a cap 32 is mounted on the tip portion of the plunger 31 to support the valve body 35, if the valve body is pressed to the valve seat to close the valve seat, the thickness dimension in the axial direction of the valve body 35 needs to be set long in order to prevent the tip surface of the valve body 35 from being dented. For this reason, when the strong valve closing force or the strong fluid pressure is exerted on the valve body 35, an amount of elastic deformation of the valve body increases and the compression permanent distortion easily occurs, so that the valve body has a structure whose dimensional accuracy is easy to deteriorate with time.

On the other hand, as shown in FIG. 4B, when a concave portion is processed in one end portion of the plunger 36 opposing the valve seat and the inner circumferential surface of the concave portion is coated with an adhesive agent to bake an elastic body such as synthetic rubber as the valve body 37, the respective steps of processing and cleaning the plunger and coating it with the adhesive agent are required before baking and the steps of cutting surplus portions and grinding the cut portions are required after the baking. Therefore, manufacture cost is increased.

Contrary to this, in the solenoid valve 10 shown in FIG. 1, the poppet 27 can be formed only by baking the valve body 19, which can be finished easily by press molding, to the supporting plate 28. In addition thereto, assembling work of the poppet 27 to the plunger 18 is completed only by press-inserting the three components including the cap 29 into one another without using any particular tools. Because the supporting plate 28 constituting the poppet 27 is made of metal and is hard to deform and its rear surface contacts with the tip surface 18d of the plunger 18, even if the valve closing force or the high fluid pressure is exerted on the valve body 19, positioning accuracy of the poppet 27 can be maintained.

A tip portion of a manual button 38, which is shifted to a position of contacting with the cap 29 or a position of not contacting therewith by a manual operation, is incorporated in the valve housing 12 shown in FIG. 1. This manual button 38 is provided with: a spring member 39 for applying a spring force to the manual button 38 in a direction of not contacting with the cap 29; and a stopper 40 for restricting a stroke end of the manual button 38 moved by the spring force of the spring member 39. An inclined surface 38a is formed at the tip portion of the manual button 38, so that if a base end portion of the manual button 38 is pressed by the manual operation against the spring force of the spring member 39, the cap 29 is pushed upward in proportion to a pushing distance of the manual button 38. That is, the plunger 18 can be pushed upward manually without carrying any current to the coil 25, so that the valve seat 13d can be opened.

The present invention is not limited to the above-described embodiment, and may be variously modified within a scope of not departing from the gist thereof. For example, the outward projecting portion 29c does not need to be provided at the tip of the cylindrical portion 29a, and it may be provided at any position of the cylindrical portion 29a if being formed so as to project outwardly. The supporting plate 28 may be made of metal or a resin as long as it has high stiffness which is hard to deform. The solenoid valve is not limited to a 3-port valve if having a plurality of ports.

INDUSTRIAL APPLICABILITY

This solenoid valve can be used as a directional control valve for making air flow in the air pressure pipe, stopping its flow, and changing the direction of its flow.

The invention claimed is:

1. A solenoid valve having: a housing in which a port in which fluid flows and a port from which the fluid flows out are formed and a valve seat provided in a flow path which mutually communicates with the ports is formed; a metallic plunger incorporated in the housing so as to oppose the valve seat and attracted by a magnetized column; a valve body provided in the plunger and opening/closing the valve seat; and a spring member for applying a spring force to the valve body in a direction of closing the valve seat, the solenoid valve comprising:
  a poppet formed by the valve body and a supporting plate, the supporting plate having a front surface to which the valve body is firmly fixed and a rear surface contacting a tip surface of the plunger; and
  a cap having a cylindrical portion, an inward projecting portion, and an outward projecting portion, the cylindrical portion being fitted to an outer circumference of the plunger, the inward projecting portion projecting inwardly from the cylindrical portion so as to abut an outer circumferential portion of the front surface of the supporting plate, and the outward projecting portion projecting outwardly from the cylindrical portion so as to be engaged with the spring member,
  wherein the poppet is attached on the tip surface of the plunger by the cap.

2. The solenoid valve according to claim 1, wherein pawl portions formed on an outer circumference of the plunger and an inner circumference of the cylindrical portion engage each other to hold the cap to the plunger in a fitted state.

* * * * *